United States Patent [19]

LeBlanc et al.

[11] Patent Number: 5,411,088
[45] Date of Patent: May 2, 1995

[54] FILTER WITH GAS SEPARATOR FOR ELECTRIC SETTING TOOL

[75] Inventors: Kenneth J. LeBlanc, Houston, Tex.; Kenneth R. Rudd, Lake Charles, La.

[73] Assignee: Baker Hughes Incorporated

[21] Appl. No.: 103,078

[22] Filed: Aug. 6, 1993

[51] Int. Cl.$^6$ ............................................. E21B 43/00
[52] U.S. Cl. .............................. 166/265; 166/105.1; 166/56
[58] Field of Search .............. 166/105.1, 105.3, 105.5, 166/105.6, 205, 382, 106

[56] References Cited

U.S. PATENT DOCUMENTS

| | | | |
|---|---|---|---|
| 1,455,871 | 5/1923 | Fleming | 166/105.1 |
| 1,548,803 | 8/1925 | Cotton | 166/105.1 |
| 1,604,019 | 10/1926 | Carnes | 166/105.1 |
| 2,429,043 | 10/1947 | Barnhart | 166/105.1 |
| 2,523,091 | 9/1950 | Bruce | 166/106 |
| 2,528,448 | 10/1950 | Munk | 166/105.5 |
| 2,652,130 | 9/1953 | Ferguson | 166/105.5 |
| 2,764,102 | 9/1956 | Abdo et al. | 166/105.5 |
| 4,481,020 | 11/1984 | Lee et al. | 166/105.5 |
| 5,207,810 | 5/1993 | Sheth | 166/105.6 |

Primary Examiner—Ramon S. Britts
Assistant Examiner—Frank S. Tsay
Attorney, Agent, or Firm—Rosenblatt & Associates

[57] ABSTRACT

The filter of the present invention overcomes the aforementioned problems by separating gas and solid particulate matter from liquid as the wellbore fluid passes through the filter. The apparatus comprises a solid tube encased in a perforated tube which extends beyond the end of the solid tube. A top cap is attached to one end of each tube and holds the tubes concentric to each other. A bottom cap is attached to the end of the perforated tube which extends beyond the solid tube. An annulus is defined by the inner surface of the perforated tube and the outer surface of the solid tube. The top cap has a bore extending therethrough which is in fluid communication with the solid tube. The filter is generally used in conjunction with a low volume pump located adjacent to and in fluid communication with the top cap. As the pump operates, wellbore fluid is drawn through the perforations of the perforated tube into the annulus between the perforated and solid tubes. Although fluid flow is turbulent outside the filter, fluid flow in the annulus stabilizes, allowing gas, liquid, and solids to separate based on their individual densities. The effect of this separation is that the gas, which is less dense than the liquid, bubbles up through the liquid and forms a distinct layer above the liquid layer. The solids, conversely, settle to the bottom of the liquid layer. The solid tube extends down beyond the gas layer into the liquid layer. Since the pump is in fluid communication with the solid tube, the liquid layer becomes the only layer from which the pump draws fluid. The result is that only liquid, substantially free of gas, is introduced into the pump. Additionally, wire cloth can be used to pre-strain the fluid before it enters the annulus, removing solid particulate matter and larger gas bubbles.

14 Claims, 3 Drawing Sheets

FILTER WITH GAS SEPARATOR FOR ELECTRIC SETTING TOOL

FIELD OF THE INVENTION

The present invention relates to electric wire line setting tools used to set bridge plugs and packers in subterranean wells by means of hydraulic pressure, and more particularly, to a filter wherein the filter substantially separates gas from wellbore liquid used to set the bridge plugs and packers.

BRIEF DESCRIPTION OF PRIOR ART

In subterranean wells, there is often a need to isolate zones of the wellbore to allow testing, servicing, or treating of particular zones. A common method of isolating these zones is through the use of bridge plugs, which are generally set in the wellbore using mechanical, electrical, or hydraulic means. One specific hydraulic means utilizes hydrocarbons from the wellbore, circulated through an actuating pump located inside a setting tool, to generate hydraulic pressure used to set the slips and expand the sealing means.

More specifically, when this method is used, a low volume actuating pump located in the setting tool draws fluid from the wellbore and delivers the fluid to the plug. Because this pump is designed to pump only liquid, cavitation will occur if gas is introduced into the pump. If cavitation occurs, the pump will lose its prime, resulting in pressure head loss and failure of the bridge plug to set.

In the past, bridge plugs have been set using this method only after a well has been shut-in and allowed to stabilize. Before stabilization, although shut-in, wellbore fluid is still a turbulent mixture of gas, solid particulate matter, and liquid. Any fluid introduced at this point into the pump contains all three components. During stabilization, the gas and solid particulate matter separate from the liquid, forming distinct layers of fluid, with the gas layer located above the liquid layer. The solid particulate matter settles to the bottom of the liquid layer. The period for this stabilization is usually between thirty-six and forty-eight hours.

Once stabilized, fluid from the liquid layer can be drawn upon to actuate the bridge plug. Commonly, the pump inlet ports are located adjacent the liquid layer so that only liquid is introduced into the pump. Because the liquid and gas are separated, there is no concern about pressure head loss due to gas entering the pump system.

A problem exists, however, when a well is bridge plugged before stabilization. Although shut in, the fluid in the wellbore is still in an agitated state; the components have not yet separated. Any fluid drawn into the pump before stabilization may contain gas, liquid, and solids. In the past, engineers have been forced to either wait until the wellbore fluid had stabilized after shut-in or risk loss of pressure head in the pump due to the presence of gas in the liquid being pumped. Thus, a need exists for a method of separating the gas and liquid components of wellbore fluid used in setting bridge plugs in shut-in wells before the wells have stabilized.

The present invention is directed toward an apparatus and method which addresses the problem set forth above.

SUMMARY OF THE INVENTION

The filter of the present invention overcomes the aforementioned problems by separating gas and solid particulate matter from liquid as the wellbore fluid passes through the filter. The apparatus comprises a solid tube encased in a perforated tube which extends beyond the end of the solid tube. A top cap is attached to one end of each tube and holds the tubes concentric to each other. A bottom cap is attached to the end of the perforated tube which extends beyond the solid tube. An annulus is defined by the inner surface of the perforated tube and the outer surface of the solid tube. The top cap has a bore extending therethrough which is in fluid communication with the solid tube. The filter is generally used in conjunction with a low volume pump located adjacent to and in fluid communication with the top cap. As the pump operates, wellbore fluid is drawn through the perforations of the perforated tube into the annulus between the perforated and solid tubes. Although fluid flow is turbulent outside the filter, fluid flow in the annulus stabilizes, allowing gas, liquid, and solids to separate based on their individual densities. The effect of this separation is that the gas, which is less dense than the liquid, bubbles up through the liquid and forms a distinct layer above the liquid layer. The solids, conversely, settle to the bottom of the liquid layer. The solid tube extends down beyond the gas layer into the liquid layer. Since the pump is in fluid communication with the solid tube, the liquid layer becomes the only layer from which the pump draws fluid. The result is that only liquid, substantially free of gas, is introduced into the pump. Additionally, wire cloth can be used to pre-strain the fluid before it enters the annulus, removing solid particulate matter and larger gas bubbles.

DESCRIPTION OF THE PREFERRED EMBODIMENT

Figure 1:
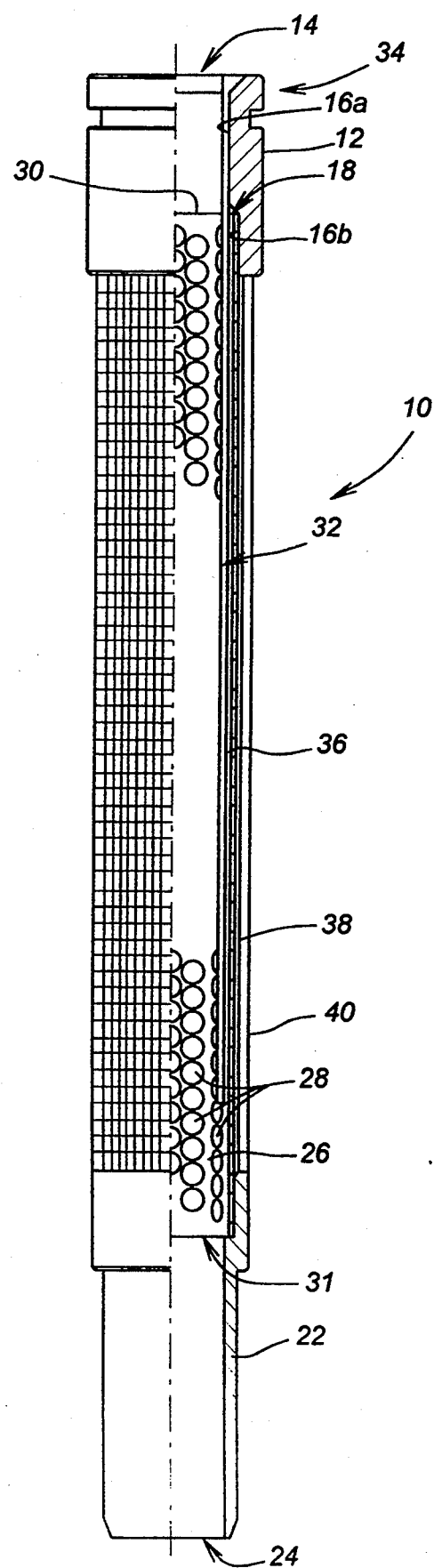
FIG. 1 shows a partial cross-section of the filter apparatus of the present invention.

Referring now to the drawings, and specifically to FIG. 1, the filter of the present invention is shown and generally designated by the numeral 10. Filter 10 comprises a top cap 12, having an axial bore 14 therethrough, a bottom cap 22, a perforated tube 26 having a plurality of perforations 28, and a solid tube 32 which is both of a smaller diameter and shorter length than perforated tube 26. Perforated tube 26 is attached at its top end 30 to top cap 12 so that bore 14 and perforated tube 26 are axially aligned. Solid tube 32 also is attached at its top end 34 to top cap 12 and extends concentrically through perforated tube 26 to define an annulus 36 therebetween, with top cap 12 closing off the top of annulus 36. Solid tube 32 and top cap 12 are in fluid communication with each other. Bottom cap 22 is attached to the bottom end 31 of perforated tube 26, closing off the bottom of annulus 36. Because solid tube 32 is shorter in length than perforated tube 26, solid tube 32 terminates before perforated tube 26, thus allowing fluid communication between annulus 36 and solid tube 32.

Figure 2:
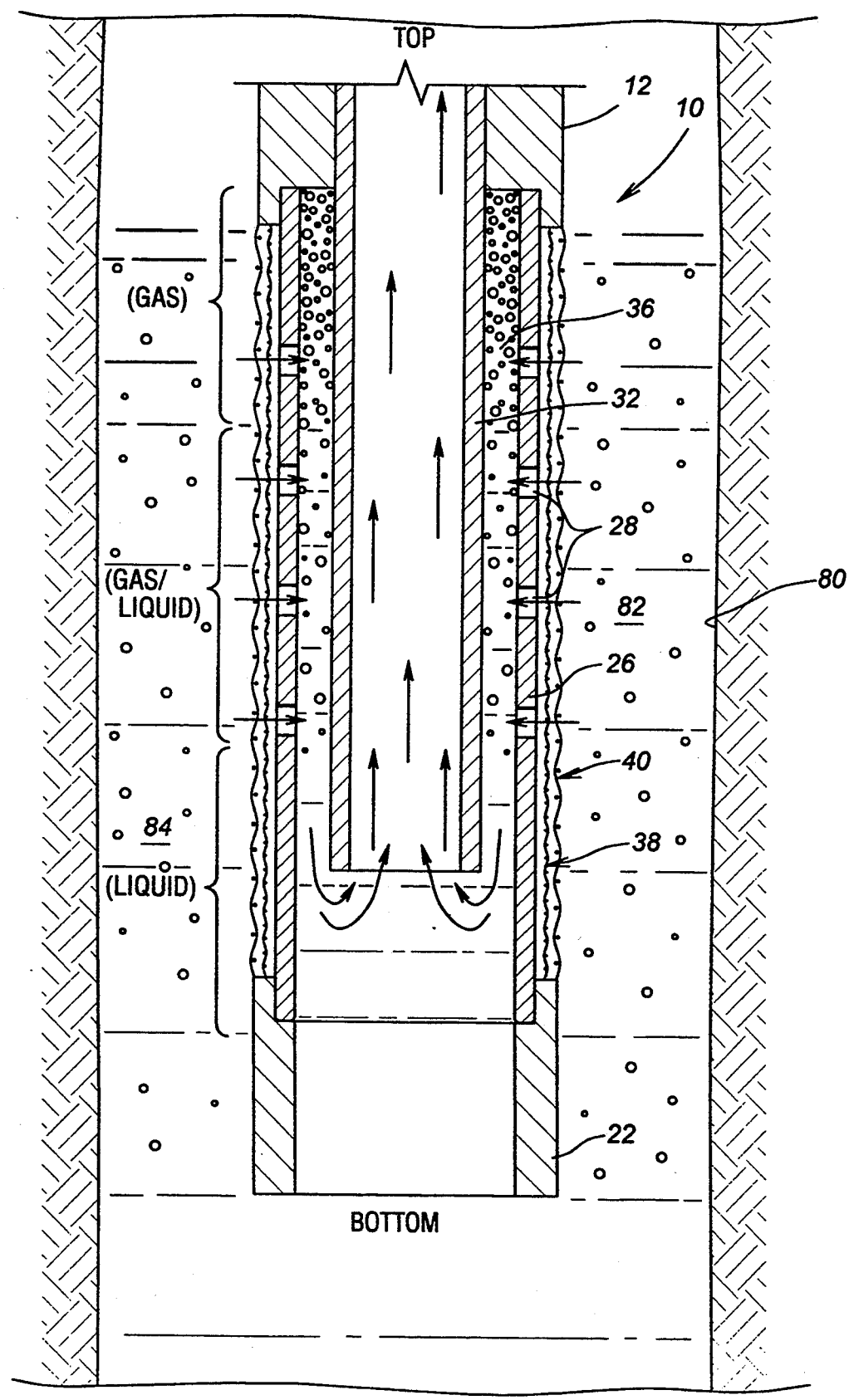
FIG. 2 shows an enlarged cross-section of the filter of the present invention to demonstrate fluid flow and oil/gas separation in the filter.

The operation of the apparatus will now be described. FIG. 2 illustrates the flow of wellbore fluid 82 through filter 10. Typically, wellbore fluid 82 comprises gas and solid particulate matter suspended in liquid. The objective of filter 10 is to remove gas suspended in the liquid. An additional benefit of filter 10 is that solid particulate matter is also filtered from the liquid. In its run-in position, filter 10 is positioned so that it is axially aligned with wellbore 80, with top cap 12 oriented above bottom cap 22. Filter 10 is intended to be used in conjunction with an actuating pump 62 located adjacent top cap 12 (shown in FIG. 3). Actuating pump 62 is in fluid communication with top cap 12. Although not intended as a limitation, but only as an example, actuating pump 62 can be rated at 160 mL per minute. During operation, wellbore fluid 82 moves through perforations 28 into annulus 36. It is well understood that the flow of wellbore fluid 82 in wellbore 80 is turbulent, and that the wellbore fluid 82 comprises gas and solid particulate matter suspended in liquid, such that the fluid is said to be aerated. It is also understood that gas has a lower density than liquid such that when an aerated fluid is placed in a stable, i.e., substantially low flowing, environment, gravity will cause the gas to migrate up through the liquid to form distinct gas and liquid layers. Additionally, suspended solids will tend to settle out of liquid when placed in a stable environment. Annulus 36 provides a substantially stable environment. Thus, as wellbore fluid 82 moves into annulus 36, suspended gas bubbles move up through the liquid to the top of annulus 36 and solid particulate matter settles to the bottom of annulus 36. A liquid column 84, free of either gas or solids, thus forms in a portion of annulus 36. Solid tube 32 extends down into liquid column 84 such that when actuating pump 62 is operated, liquid is drawn into solid tube 32 from liquid column 84 up through top cap 12 to the inlet port of actuating pump 62. The accumulated gas in the annulus 36 can escape through openings 28 most adjacent top cap 12. Because liquid column 84 is no longer aerated, the concern of drawing gas into actuating pump 62, causing cavitation, is overcome.

Referring now to FIGS. 1 and 2, it should be understood that there is no specific length for solid tube 32, other than the requirement that its length be selected so that it extends for a shorter distance than perforated tube 26. In one embodiment, the length of solid tube 32 was selected so that the end of solid tube 32 terminates at a point in liquid column 84 far enough above the end of perforated tube 26 so that solid particulate matter that settles to the bottom of liquid column 84 will not be drawn into solid tube 32 by pump 62. Accordingly, the point at which solid tube 32 terminates in liquid column 84, and hence the length of solid tube 32, will vary depending on the velocity created by actuating pump 62.

In a second embodiment, a first wire cloth 38 encases perforated tube 26. Wire cloth 38 can be used to pre-filter wellbore fluid 82 passing through perforations 28, removing both solid particulate matter and gas bubbles. Although not intended as a limitation, but only as an example, the sieve size of wire cloth 38 can be 250×250 mesh. A second wire cloth 40, whose sieve size is larger than wire cloth 38, can be used to encase wire cloth 38 to add rigidity to wire cloth 38 and hold it in place on perforated tube 26. Although not intended as a limitation, but only as an example, the sieve size of wire cloth 40 can be 10×10 mesh.

Although solid tube 32, perforated tube 26, and top cap 12 can be configured in a number of ways that satisfy the spirit of the invention, the embodiment illustrated by FIG. 1 envisions bore 14 having a first diameter 16a and a second diameter 16b, larger than first diameter 16a, such that the two diameters form a top lip 18 at their intersection. Perforated tube 26 is attached to top cap 12 at its second diameter 16b so that the top end 30 of perforated tube 26 abuts top lip 18. Solid tube 32 is attached to top cap 12 at its first diameter 16a so that top lip 18 closes off the top of annulus 36.

Figure 3:
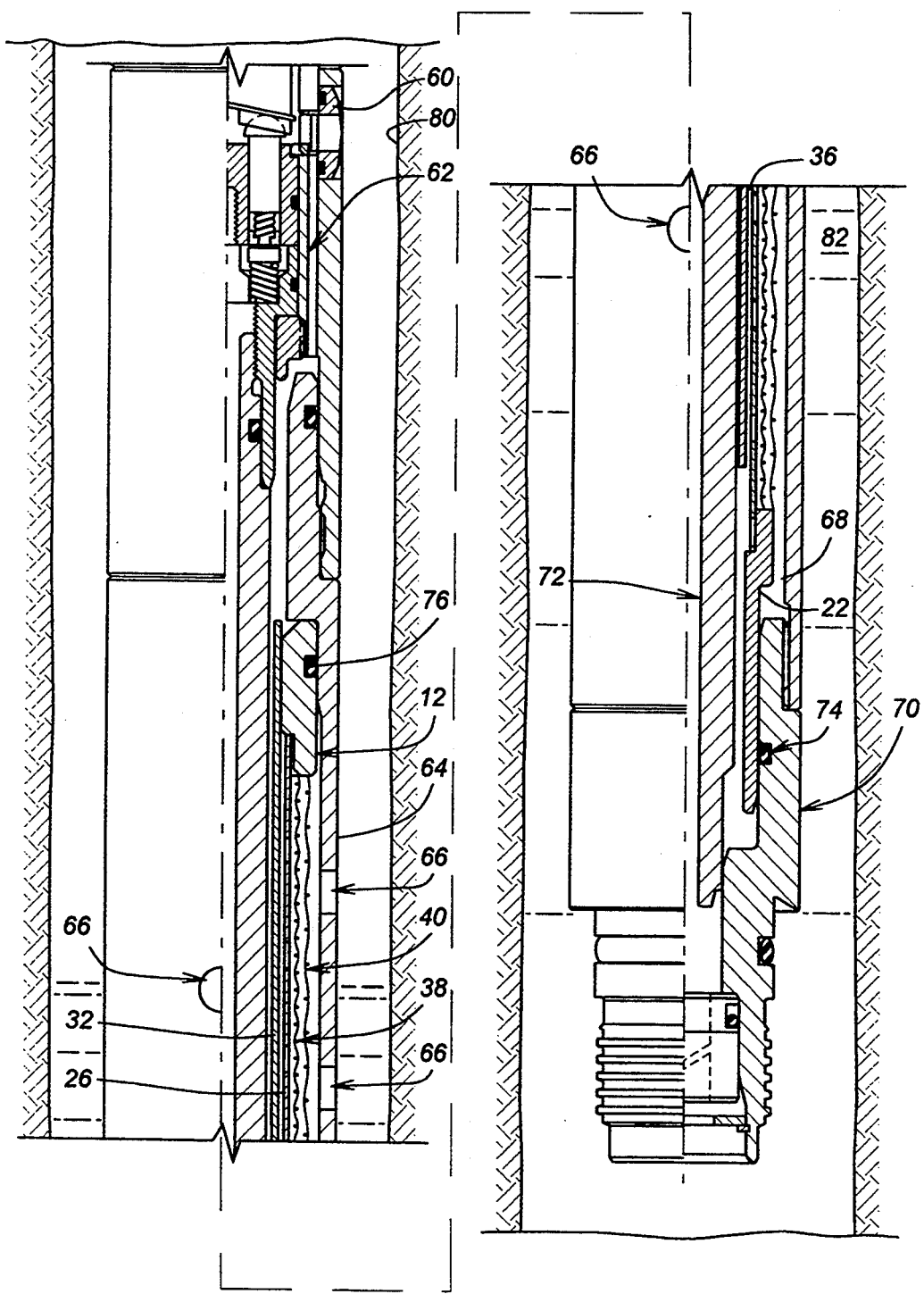
FIG. 3 shows a partial cross-section of a wireline setting tool with the filter apparatus of the present invention inserted below the actuating pump.

FIG. 3 illustrates the use of filter 10 in wireline setting tool 60 as it is used to hydraulically set a bridge plug (not shown) in wellbore 80. In this preferred embodiment, bottom cap 22 also has an axially aligned bore 14 therethrough. Filter 10 is disposed in an inlet housing 64 which comprises a portion of wireline setting tool 60, which need not be described in further detail. Filter 10 and inlet housing 64 form a second annulus 68 therebetween. A bottom adaptor 70 is coupled to inlet housing 64 and accepts bottom cap 22 in sealing contact so that bottom adaptor 70 closes off second annulus 68 from below. One method of achieving sealing contact is through the use of o-rings. O-ring 74 is positioned on bottom adaptor 70 to effectuate sealing. Similarly, o-ring 76 is positioned on top cap 12 to effectuate sealing. Filter 10 is disposed in inlet housing 64 so that top cap 12 is in sealing contact with inlet housing 64, closing off second annulus 68 from above. Inlet housing 64 has a plurality of ports 66 which allow fluid communication between wellbore 80 and second annulus 68. Actuating pump 62 is located in wireline setting tool 60 above filter 10 so that the inlet port of actuating pump 62 is in fluid communication with top cap 12. A pump mandrel 72 extends from the exit port of pump 62 down through filter 10, allowing fluid communication between the exit port of actuating pump 62 and a bridge plug (not shown). When tool 60 is in operation, wellbore fluid 82 flows from wellbore 80 into second annulus 68. Because fluid 82 in second annulus 68 is in a substantially stable environment, gas begins to separate out of liquid before passing through filter 10. Furthermore, the stable environment within second annulus 68 enables solid particulate matter suspended in the liquid to settle to the downhole end of second annulus 68. As fluid passes into filter 10, gas bubbles and solid particulate matter still remaining in the liquid are further filtered from the liquid by first wire cloth 38 and second wire cloth 40. Finally, any remaining gas and solid particulate still suspended in the liquid separate out of the liquid in annulus 36 as described above, forming liquid column 84 at the bottom of annulus 36. Solid tube 32 draws liquid from liquid column 84. The liquid is drawn through pump 62 and pumped down through pump mandrel 72 to the bridge plug.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. An apparatus for use in combination with a downhole pump which pumps well fluids for operating a downhole tool comprising:

a housing having openings thereon to allow passage of well fluids containing solids and/or gas therethrough;

pump connected to said housing;

an outlet member on said housing extending sufficiently into said housing to form a separation zone between said openings in said housing and said outlet member, said separation zone having an upper and lower end, said outlet member providing fluid communication from adjacent said lower end of said separation zone to said pump through an opening in said outlet member;

at least one of said openings on said housing aligned with said upper end of said separation zone to allow any separated gas from said separation zone to escape said housing;

said separation zone having an annular shape and allowing any solids passing into it from said openings in said housing to drop directly by gravity to said lower end upon entry; and a downhole tool connected to said pump, whereupon said pump draws liquid through said outlet member of said housing and pumps the liquid to said downhole tool to actuate said downhole tool.

2. The apparatus of claim 1, wherein:

said housing comprises an elongated tubularly shaped cylinder; and said outlet comprises a tube inserted into said housing to define an annular volume which serves as said separation zone.

3. The apparatus of claim 2, wherein:

said openings in said housing are distributed in fluid communication into said annular volume between said upper and lower ends of said zone.

4. The apparatus of claim 3, wherein:

said upper end of said zone is closed off adjacent said outlet member into said housing.

5. The apparatus of claim 4, wherein:

said openings in said housing are covered with a filter media.

6. The apparatus of claim 5, wherein:

said filter media further comprises a mesh screen.

7. The apparatus of claim 6, wherein said filter media comprise:

a first screen; and a second screen overlaying said first screen for structural support thereof, said first screen having smaller openings than said second screen.

8. A method for separating wellbore solids and/or gases from liquids for use as a motive fluid for operating a downhole tool capable of selectively sealing off a portion of the wellbore, comprising the steps of:

lowering a pump with the downhole tool into the wellbore;

extending a suction line from the pump into separator having a perforated housing;

creating an annular stilling chamber between said suction line and said perforated housing;

allowing gases to separate from liquid in said stilling chamber;

allowing solids to drop directly by gravity toward the bottom of said stilling chamber upon passing through said perforated housing;

drawing from the liquid phase through said suction line; and operating the downhole tool to selectively seal off a portion of the wellbore with pressure developed from said pump.

9. The method of claim 8, further comprising the steps of:

providing a settlement zone in said housing below said suction line; and allowing solids to settle in said settlement zone.

10. The method for claim 9, further comprising the step of: screening the openings in said perforated housing.

11. The method of claim 10, wherein said screening step further comprises:

overlaying a second screen on a first screen over said perforations, where said first screen has smaller openings than said second screen.

12. The method of claim 11, further comprising:

allowing separated gas to leave said stilling chamber through some of said perforations.

13. The method of claim 12, further comprising:

extending a discharge line connecting the pump to the downhole tool through said perforated housing.

14. The method of claim 13, wherein said extending a discharge line step further comprises:

extending said discharge line coaxially with said suction line; and sealing off said discharge line from a flowpath through said perforated openings and into said suction line.

* * * * *